(12) United States Patent
Ding et al.

(10) Patent No.: US 9,385,948 B2
(45) Date of Patent: Jul. 5, 2016

(54) PACKET PROCESSING METHOD, DEVICE AND SYSTEM

(71) Applicant: Huawei Technologies Co., LTD, Shenzhen (CN)

(72) Inventors: Wanfu Ding, Beijing (CN); Enhui Liu, Beijing (CN); Chengyong Lin, Beijing (CN); Fengkai Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 13/873,919

(22) Filed: Apr. 30, 2013

(65) Prior Publication Data

US 2013/0308651 A1    Nov. 21, 2013

(30) Foreign Application Priority Data

May 21, 2012 (CN) .......................... 2012 1 0157767

(51) Int. Cl.
*H04L 12/721* (2013.01)
*H04L 12/755* (2013.01)

(52) U.S. Cl.
CPC .............. *H04L 45/38* (2013.01); *H04L 45/021* (2013.01)

(58) Field of Classification Search
USPC ......... 370/235, 238, 241, 242, 254, 255, 392; 709/223, 224
See application file for complete search history.

(56) References Cited

U.S. PATENT DOCUMENTS

| 7,817,549 B1* | 10/2010 | Kasralikar et al. ............ 370/232 |
| 2005/0276230 A1 | 12/2005 | Akahane et al. |
| 2007/0025396 A1 | 2/2007 | Ajima |
| 2011/0261723 A1* | 10/2011 | Yamato et al. ................ 370/255 |
| 2011/0261825 A1 | 10/2011 | Ichino |
| 2011/0310901 A1 | 12/2011 | Uchida et al. |
| 2012/0099591 A1 | 4/2012 | Kotha et al. |
| 2013/0163426 A1* | 6/2013 | Beliveau et al. .............. 370/235 |
| 2014/0016476 A1* | 1/2014 | Dietz et al. ..................... 370/238 |

FOREIGN PATENT DOCUMENTS

| CN | 101026492 A | 8/2007 |
| CN | 101789905 A | 7/2010 |
| CN | 102263664 A | 11/2011 |
| EP | 2058736 A2 | 5/2009 |
| JP | 2006005402 | 1/2006 |
| JP | 2007036910 | 2/2007 |
| JP | 2007221240 A | 8/2007 |

(Continued)

OTHER PUBLICATIONS

Translation of Japanese Office Action received in Application No. 2013-105078 mailed May 7, 2014, 4 pages. (Partial Translation).

(Continued)

*Primary Examiner* — Awet Haile
(74) *Attorney, Agent, or Firm* — Slater Matsil, LLP

(57) ABSTRACT

The present application provides a packet processing method, device and system. With the present application, timely processing can be performed on a received packet according to an added first flow table entry, so that the timely processing can be implemented for a flow whose importance is high, and the problem in the prior art that a forwarding device cannot add a new flow table entry to a flow table because all flow table entry resources are in use can be relieved, thereby improving the reliability of packet processing.

23 Claims, 1 Drawing Sheet

(56) References Cited

FOREIGN PATENT DOCUMENTS

| JP | 2008172706 A | 7/2008 |
|---|---|---|
| JP | 2012235400 A | 11/2012 |
| JP | 2013168817 | 8/2013 |
| WO | 2011102312 A1 | 8/2011 |

OTHER PUBLICATIONS

Chinese Search Report received in Application No. 201210157767.6 mailed Jan. 20, 2014, 8 pages.

Open Flow Switch Specification, Version 1.2 (Wire Protocol 0x03), Dec. 5, 2011, 82 pages.

Open Flow Switch Specification, Version 1.3-rcl (Wire Protocol 0x04), Mar. 22, 2012, 96 pages.

Ram, Kaushik, et al., "sNICh: Efficient Last Hop Networking in the Data Center," ANCS, Oct. 25-26, 2010, 13 pages.

Sarrar, Nadi, et al., "Leveraging Xipf's Law for Traffic Offloading," ACM Sigcomm Computer Communication Review, vol. 42, No. 1, Jan. 2012, 7 pages.

\* cited by examiner

PACKET PROCESSING METHOD, DEVICE AND SYSTEM

CROSS-REFERENCE TO RELATED APPLICATIONS

This application claims priority to Chinese Patent Application No. 201210157767.6, filed on May 21, 2012, which is hereby incorporated by reference in its entirety.

FIELD OF THE INVENTION

The present application relates to data processing technologies, and in particular, to a packet processing method, device and system.

BACKGROUND OF THE INVENTION

With the development of Internet, a distributed system cannot better satisfy the requirement of the network scalability and management, and therefore, a control and forwarding separation centralized system emerges as the times require. For example: an open flow (OpenFlow) system is a kind of control and forwarding separation centralized system, and an OpenFlow switch (OpenFlow Switch) transforms a packet forwarding process controlled originally and entirely by a switch/router into a process completed by the OpenFlow switch and a controller (Controller) collectively, thereby implementing the separation of data forwarding and routing control. The controller may control a flow table of the OpenFlow switch through an interface operation stipulated in advance, thereby achieving the objective of controlling data forwarding. For a packet entering the OpenFlow switch, the OpenFlow switch may obtain a flow table entry matched with the packet by querying the flow table. According to the flow table entry, an operation required to be executed on the packet may be determined, and the operation, for example, may be to forward the packet to a destination port, to discard the packet or to report the packet to the controller. For the first packet of a flow, the OpenFlow switch may report the packet to the controller because no flow table entry is obtained by matching, and the controller establishes a new flow table entry for the flow to which the packet belongs, and delivers the packet to the OpenFlow switch, so that the OpenFlow switch adds the new flow table entry to the flow table.

However, when all flow table entry resources are in use, the OpenFlow switch cannot add the new flow table entry to the flow table, so that the OpenFlow switch cannot perform timely processing on the new flow, so as to cause the reduction of the reliability of packet processing. Similar problems also exist in other control and forwarding separation centralized systems.

SUMMARY OF THE INVENTION

A plurality of aspects of the present application provides a packet processing method, device and system, so as to improve the reliability of packet processing.

One aspect of the present application provides an access control method, which is applied to a control and forwarding separation centralized system, and the method includes:
  receiving a first flow table entry sent by a controller, where the first flow table entry includes first importance information used for indicating importance of a first flow;
  if no idle flow table entry resource exists in a flow table, determining whether a second flow table entry exists in the flow table, where the second flow table entry includes second importance information used for indicating importance of a second flow, and the importance indicated by the second importance information is less than the importance indicated by the first importance information; and
  if the second flow table entry exists in the flow table, deleting the second flow table entry in the flow table, and adding the first flow table entry to the flow table.

Another aspect of the present application provides a packet processing device, which is applied to a control and forwarding separation centralized system, and the device includes:
  a receiver, configured to receive a first flow table entry sent by a controller, where the first flow table entry includes first importance information used for indicating importance of a first flow; and
  a processor, configured to, if no idle flow table entry resource exists in a flow table, determine whether a second flow table entry exists in the flow table, where the second flow table entry includes second importance information used for indicating importance of a second flow and the importance indicated by the second importance information is less than the importance indicated by the first importance information; and if the second flow table entry exists in the flow table, delete the second flow table entry in the flow table, and add the first flow table entry to the flow table.

Another aspect of the present application provides a packet processing system, which is applied to a control and forwarding separation centralized system, and the system includes a controller and the above packet processing device.

It can be learned from the above technical solutions that, the embodiments of the present application can perform timely processing on a received packet according to an added first flow table entry, thereby implementing the timely processing for a flow whose importance is high, and the problem in the prior art that a forwarding device cannot add a new flow table entry to the flow table because all flow table entry resources are in use can be relieved, thereby improving the reliability of packet processing.

BRIEF DESCRIPTION OF THE DRAWINGS

To describe the technical solutions in the embodiments of the present application more clearly, the following briefly introduces the accompanying drawings for describing the embodiments. Apparently, the accompanying drawings in the following description show some embodiments of the present application, and persons of ordinary skill in the art may still derive other drawings from the accompanying drawings without creative efforts.

DETAILED DESCRIPTION OF THE EMBODIMENTS

To make the objectives, technical solutions, and advantages of embodiments of the present application more comprehensible, the following clearly describes the technical solutions in the embodiments of the present application with reference to the accompanying drawings in the embodiments of the present application. Apparently, the embodiments to be described are merely a part rather than all of the embodiments of the present application. All other embodiments obtained by persons of ordinary skill in the art based on the embodiments of the present application without making creative efforts shall fall within the protection scope of the present application.

In addition, the term "and/or" in this document is only an association relationship for describing associated objects, and represents that three relationships may exist, for example, A and/or B may represent the following three cases: A exists separately, both A and B exist, and B exists separately. In addition, the character "/" in this document usually represents that the former and later associated objects are in a "or" relationship.

It should be noted that, technical solutions of the present invention may be applicable to a control and forwarding separation centralized system, such as an OpenFlow system.

Figure 1:
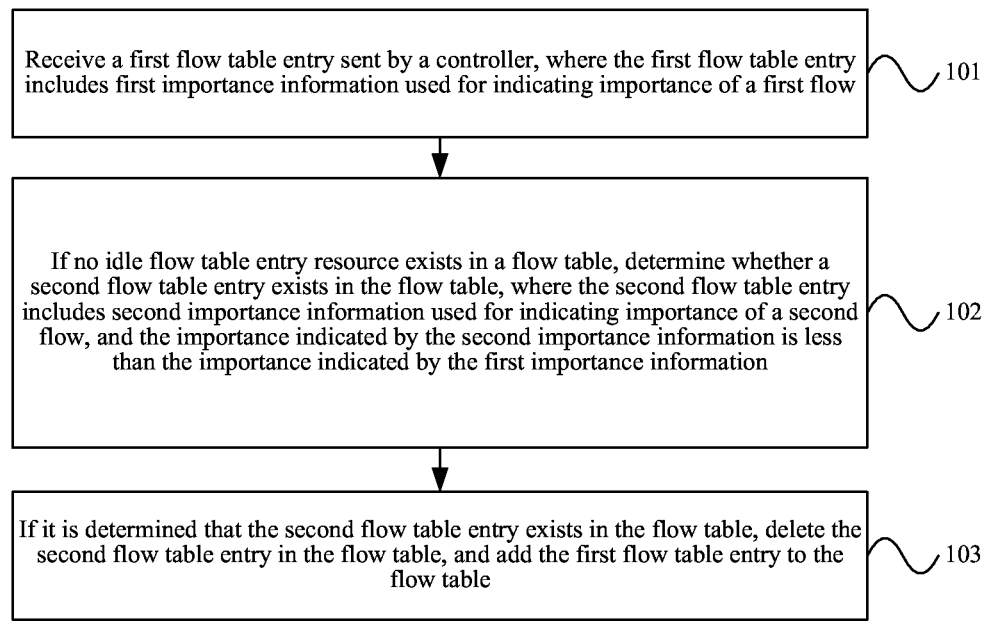
FIG. 1 is a schematic flow chart of a packet processing method according to an embodiment of the present application.

FIG. 1 is a schematic flow chart of a packet processing method according to an embodiment of the present application, as shown in FIG. 1.

101: Receive a first flow table entry sent by a controller, where the first flow table entry includes first importance information used for indicating importance of a first flow.

102: If no idle flow table entry resource exists in a flow table, determine whether a second flow table entry exists in the flow table, where the second flow table entry includes second importance information used for indicating importance of a second flow, and the importance indicated by the second importance information is less than the importance indicated by the first importance information.

103: If it is determined that the second flow table entry exists in the flow table, delete the second flow table entry in the flow table, and add the first flow table entry to the flow table.

That no idle flow table entry resource exists in the flow table means that, all flow table entry resources are in use, namely, the flow table is full.

Optionally, in an optional implementation manner of this embodiment, the importance information may be carried in a field of a flow table entry in the prior art, or carried in a newly-added field of the flow table entry, which is not limited in this embodiment. Specifically, the importance information may include, but is not limited to, at least one of the following information:

flow table entry matching priority information (for example: Priority carried in the flow table entry in the prior art), where the higher the priority identified by the flow table entry matching priority information is, the higher the importance of the corresponding flow is; and flow table entry matching times information (for example: Counters carried in the flow table entry in the prior art), where the larger the times identified by the flow table entry matching times information is, the higher the importance of the corresponding flow is.

Optionally, the newly-added field may be used to set the importance of the flow table entry according to counted least recently used (Least Recently Used) times, for example: the larger the least recently used times of the flow is, the higher the importance of the flow table entry is; or the importance of the flow table entry may be set according to the number of counted packets in a period of time, for example: the larger the number of packets included in the flow is, the higher the importance of the flow table entry is, which is not limited in this embodiment.

Optionally, the importance information may indicate the importance of the flow alone.

Optionally, the importance information may be combined together to indicate the importance of the flow. For example:
when the importance of two flows (flow 1 and flow 2) indicated by the flow table entry matching priority information (for example: Priority in the flow table entry in the prior art) is equal, if the flow table entry matching times information in the flow table entry corresponding to the flow 1 indicates higher matching times, the importance of the flow 1 is higher; and if the flow table entry matching times information in the flow table entry corresponding to the flow 2 indicates higher matching times, the importance of the flow 2 is higher. When the importance information is combined together to indicate the importance of the flow, the importance may be configured according to a specific requirement, which is not specifically limited in the present invention.

It should be noted that, an execution subject of the above 101, 102 and 103 may be a forwarding device. For example: in an OpenFlow system, the forwarding device may be an OpenFlow switch.

It should be understood that, after deleting the second flow table entry in the flow table, the forwarding device may further send a deleting message to the controller, so as to notify the controller that the second flow table entry in the flow table is deleted.

Optionally, in an optional implementation manner of this embodiment, after 102, if the forwarding device determines that the second flow table entry does not exist in the flow table, the forwarding device may send an error message to the controller, to indicate that in the flow table, there is no idle flow table entry resource for adding the first flow table entry, which can decrease the number of error messages received by the controller, thereby reducing the processing burden of the controller.

For example: in an OpenFlow system, an OpenFlow switch sends an error message ofp_error_msg to the controller, where a flow table add failed type (OFPET_FLOW_MOD_FAILED) and a flow table full code (OFPFMFC_ALL_TABLES_FULL) are carried in the ofp_error_msg.

In addition, the moment when the flow table is full is a critical moment, and the forwarding device sends the received first packet of the flow to the controller. The forwarding device can add the flow table entry of a flow whose importance is high to the flow table in time, so the possibility of sending a subsequent packet of the flow to the controller may be reduced, thereby further reducing the processing burden of the controller.

Optionally, in an optional implementation manner of this embodiment, if a table-miss entry exists in the flow table, because the table-miss entry is pre-configured with the importance information being lowest, the importance indicated by the second importance information may be the second lowest.

Optionally, in an optional implementation manner of this embodiment, if no table-miss entry exists in the flow table, the importance indicated by the second importance information may be the lowest.

In this embodiment, the first flow table entry sent by the controller is received, where the first flow table entry includes first importance information used for indicating importance of the first flow. If no idle flow table entry resource exists in the flow table, it is determined whether the second flow table entry exists in the flow table, where the second flow table entry includes second importance information used for indicating importance of the second flow, and the importance indicated by the second importance information is less than the importance indicated by the first importance information. If it is determined that the second flow table entry exists in the flow table, the second flow table entry in the flow table is deleted, and the first flow table entry is added to the flow table, so that timely processing can be performed on a received packet according to the added first flow table entry, thereby implementing the timely processing for the flow whose importance is high, and the problem in the prior art that, the forwarding device cannot add the new flow table entry to the flow table because all flow table entry resources are in use can be relieved, thereby improving the reliability of packet processing.

It should be noted that, for brevity, each of the foregoing method embodiments is represented as a series of actions. However, persons skilled in the art should be aware that the present application is not limited to the order of the described actions because according to the present application, some steps may adopt other order or may occur simultaneously. It should be further understood by persons skilled in the art that all the embodiments described in the specification belong to exemplary embodiments, and the involved actions and modules are not necessarily required by the present application.

In the foregoing embodiments, the description of each of the embodiments has respective focuses. For a part that is not described in detail in a certain embodiment, reference may be made to related description in other embodiments.

Figure 2:
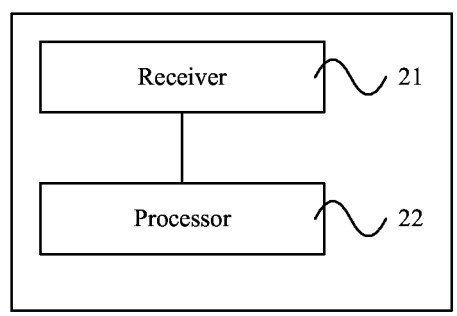
FIG. 2 is a schematic structural diagram of a packet processing device according to another embodiment of the present application.

FIG. 2 is a schematic structural diagram of a packet processing device according to another embodiment of the present application. As shown in FIG. 2, the packet processing device of this embodiment may include a receiver 21 and a processor 22. The receiver 21 is configured to receive a first flow table entry sent by a controller, where the first flow table entry includes first importance information used for indicating importance of a first flow; and the processor 22 is configured to, if no idle flow table entry resource exists in a flow table, determine whether a second flow table entry exists in the flow table, where the second flow table entry includes second importance information used for indicating importance of a second flow, and the importance indicated by the second importance information is less than the importance indicated by the first importance information; and if it is determined that the second flow table entry exists in the flow table, delete the second flow table entry in the flow table, and add the first flow table entry to the flow table.

Optionally, in an optional implementation manner of this embodiment, the importance information may be carried in a field of a flow table entry in the prior art, or carried in a newly-added field of the flow table entry, which is not limited in this embodiment. Specifically, the importance information may include, but is not limited to, at least one of the following information:

flow table entry matching priority information (for example: Priority carried in the flow table entry in the prior art), where the higher the priority identified by the flow table entry matching priority information is, the higher the importance of the corresponding flow is; and flow table entry matching times information (for example: Counters carried in the flow table entry in the prior art), where the larger the times identified by the flow table entry matching times information is, the higher the importance of the corresponding flow is.

Optionally, the newly-added field may be used to set the importance of the flow table entry according to counted least recently used (Least Recently Used) times, for example: the larger the least recently used times of the flow is, the higher the importance of the flow table entry is; or the importance of the flow table entry may be set according to the number of counted packets in a period of time, for example: the larger the number of packets included in the flow is, the higher the importance of the flow table entry is, which is not limited in this embodiment.

Optionally, the importance information may indicate the importance of the flow alone.

Optionally, the importance information may be combined together to indicate the importance of the flow. For example: when the importance of two flows (flow 1 and flow 2) indicated by the flow table entry matching priority information (for example: Priority in the flow table entry in the prior art) is equal, if the flow table entry matching times information in the flow table entry corresponding to the flow 1 indicates higher matching times, the importance of the flow 1 is higher; and if the flow table entry matching times information in the flow table entry corresponding to the flow 2 indicates higher matching times, the importance of the flow 2 is higher. When the importance information is combined together to indicate the importance of the flow, the importance may be configured according to a specific requirement, which is not specifically limited in the present invention.

It should be noted that, the packet processing device provided by this embodiment may be an OpenFlow switch in an OpenFlow system.

Optionally, in an optional implementation manner of this embodiment, if the processor 22 determines that the second flow table entry does not exist in the flow table, an error message may be sent to the controller, to indicate that in the flow table, there is no idle flow table entry resource for adding the first flow table entry, which can decrease the number of error messages received by the controller, thereby reducing the processing burden of the controller.

For example: in an OpenFlow system, a sender of the packet processing device (namely, an OpenFlow switch) may send an error message ofp_error_msg to the controller, where a flow table add failed type (OFPET_FLOW_MOD_FAILED) and a flow table full code (OFPFMFC_ALL_TABLES_FULL) are carried in the ofp_error_msg.

In addition, the moment when the flow table is full is a critical moment, and a forwarding device sends the received first packet of the flow to the controller. The forwarding device can add the flow table entry of a flow whose importance is high to the flow table in time, so the possibility of sending a subsequent packet of the flow to the controller may be reduced, thereby further reducing the processing burden of the controller.

Optionally, in an optional implementation manner of this embodiment, if table-miss entry exists in the flow table, because the table-miss entry is pre-configured with the importance information being lowest, the importance indicated by the second importance information may be the second lowest.

Optionally, in an optional implementation manner of this embodiment, if no table-miss entry exists in the flow table, the importance indicated by the second importance information may be the lowest.

In this embodiment, the receiver receives the first flow table entry sent by the controller, where the first flow table entry includes the first importance information used for indicating the importance of the first flow. If no idle flow table entry resource exists in the flow table, the processor determines whether the second flow table entry exists in the flow table, where the second flow table entry includes the second importance information used for indicating the importance of the second flow, and the importance indicated by the second importance information is less than the importance indicated by the first importance information. If it is determined that the second flow table entry exists in the flow table, the processor deletes the second flow table entry in the flow table, and adds the first flow table entry to the flow table, so that timely processing can be performed on a received packet according to the added first flow table entry, thereby implementing the timely processing for the flow whose importance is high, and the problem in the prior art that a forwarding device cannot add a new flow table entry to the flow table because all flow table entry resources are in use can be relieved, thereby improving the reliability of packet processing.

Another embodiment of the present invention provides a packet processing system, which is applied to a control and forwarding separation centralized system and includes a controller and the packet processing device provided by the embodiment corresponding to the above FIG. 2.

Persons skilled in the art may clearly understand that, for the purpose of convenient and brief description, for the detailed working processes of the system, apparatus, and units described above, reference may be made to the corresponding process in the method embodiment, and details are not described herein again.

In the several embodiments provided by the present application, it should be understood that the disclosed system, apparatus, and method may be implemented in other manners. For example, the described apparatus embodiment is merely exemplary. For example, the unit division is merely logical function division and may be other division in practical implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in each embodiment of the present application may be integrated into one processing unit, or each of the units may exist alone physically, or two or more units are integrated into one unit. The integrated unit may be implemented through hardware, or may be implemented in a form of hardware plus a software functional module.

The integrated unit implemented in the form of software functional unit may be stored in a computer readable storage medium. The software functional unit is stored in a storage medium, and contains several instructions used to instruct a computer equipment (for example, a personal computer, a server, or a network equipment) or a processor (processor) to perform the steps of the method in each embodiment of the present application. The storage medium includes: any medium that can store program codes, such as a USB flash disk, a removable hard disk, a read-only memory (ROM, Read-Only memory), a random access memory (RAM, Random Access Memory), a magnetic disk, or an optical disk.

Finally, it should be noted that the foregoing embodiments are merely intended for describing the technical solutions in the present application, other than limiting the present application. Although the present application is described in detail with reference to the embodiments, persons of ordinary skill in the art should understand that they may still make modifications to the technical solutions described in the foregoing embodiments, or make equivalent replacements to some technical features thereof, and such modifications or replacements cannot cause the essence of the corresponding technical solutions to depart from the idea and scope the technical solutions of the embodiments of the present application.

What is claimed is:

1. A method performed by a network device acting as a forwarding element within a centralized system in which a control plane and a data plane are decoupled, the method comprising:
   receiving a first flow entry from a controller, wherein the first flow entry comprises first information for indicating importance of the first flow entry, wherein the importance of the first flow entry is used to determine whether to delete a second flow entry, the second flow entry having second information for indicating importance of the second flow entry, in response to determining that there exists no idle resource for storing the first flow entry in a flow table;
   determining whether an idle resource for storing the first flow entry in a flow table exists;
   in response to determining that no idle resource for storing the first flow entry in the flow table exists, determining whether the second flow entry exists in the flow table, wherein the second flow entry comprises the second information for indicating importance of the second flow entry and wherein the importance indicated by the second information is lower than the importance indicated by the first information; and
   in response to determining that the second flow entry exists in the flow table, deleting the second flow entry from the flow table and then adding the first flow entry to the flow table.

2. The method according to claim 1, wherein the first information and the second information respectively comprise priority information indicating matching precedence of a flow entry, wherein a higher priority identified by the priority information indicates a higher importance of a flow; or
   wherein the first information and the second information respectively comprise information indicating flow table entry matching times, wherein a greater number of times identified by the information indicating flow table entry matching times indicates a higher importance of a flow.

3. The method according to claim 1, further comprising sending an error message to the controller when the second flow entry does not exist in the flow table, the error message indicating that no idle resource for storing the first flow entry in the flow table exists.

4. The method according to claim 1, wherein the importance indicated by the second information is the second lowest when a table-miss entry exists in the flow table.

5. The method according to claim 1, wherein the importance indicated by the second information is the lowest when no table-miss entry exists in the flow table.

6. The method according to claim 1, further comprising, if the second flow entry does not exist in the flow table, sending an error message to the controller to indicate that no idle resource for storing the first flow entry in the flow table exists.

7. The method according to claim 1, wherein the importance indicated by the second information is the second lowest if a table-miss entry exists in the flow table.

8. The method according to claim 1, wherein the centralized system comprises an open flow system.

9. The method according to claim 1, wherein the importance indicated by the second information is the lowest when no table-miss entry exists in the flow table.

10. A network device acting as a forwarding element, applied to a centralized system in which a control plane and a data plane are decoupled, the network device, comprising:
a receiver, configured to receive a first flow entry from a controller, wherein the first flow entry comprises first information for indicating importance of the first flow entry, wherein the importance of the first flow entry is used to determine whether to delete a second flow entry, the second flow entry comprising second information for indicating importance of the second flow entry, in response to determining that there exists no idle resource for storing the first flow entry in a flow table; and
a processor, configured to determine whether an idle resource for storing the first flow entry in the flow table exists, and, in response to determining that no idle resource for storing the first flow entry in the flow table exists, determine whether the second flow entry exists in the flow table, wherein the second flow entry comprises the second information for indicating importance of the second flow entry and the importance indicated by the second information is lower than the importance indicated by the first information,
wherein the processor is further configured to, in response to determining that the second flow entry exists in the flow table, delete the second flow entry from the flow table and then add the first flow entry to the flow table.

11. The network device according to claim 10, wherein the first information and the second information respectively comprise priority information indicating matching precedence of a flow entry, wherein a higher priority identified by the priority information indicates a higher importance of a flow; or
wherein the first information and the second information respectively comprise information indicating flow table entry matching times, wherein a greater number of times identified by the information indicating flow table entry matching times indicates a higher importance of a flow.

12. The network device according to claim 10, wherein, the processor is further configured to send an error message to the controller when the second flow entry does not exist in the flow table, the error message indicating that no idle resource for storing the first flow entry in the flow table exists.

13. The network device according to claim 10, wherein the importance indicated by the second information is the second lowest when a table-miss entry exists in the flow table.

14. The network device according to claim 10, wherein the importance indicated by the second information is the lowest if when no table-miss entry exists in the flow table.

15. The network device according to claim 10, wherein the processor is further configured to send an error message to the controller when the second flow entry does not exist in the flow table, the error message indicating that the no idle resource for storing the first flow entry in the flow table exists.

16. The network device according to claim 10, wherein the importance indicated by the second information is the second lowest when a table-miss entry exists in the flow table.

17. The network device according to claim 10, wherein the centralized system comprises an open flow system.

18. The network device according to claim 10, wherein the importance indicated by the second information is the lowest when no table-miss entry exists in the flow table.

19. A system in which a control plane and a data plane are decoupled, comprising:
a receiver, configured to receive a first flow entry from a controller, wherein the first flow entry comprises first information for indicating importance of the first flow entry, wherein the importance of the first flow entry is used to determine whether to delete a second flow entry, the second flow entry comprising second information for indicating importance of the second flow entry, in response to determining that there exists no idle resource for storing the first flow entry in a flow table; and
a processor, configured to determine whether an idle resource for storing the first flow entry in the flow table exists, and, in response to determining that no idle resource for storing the first flow entry in the flow table exists, determine whether the second flow entry exists in the flow table, wherein the second flow entry comprises second information for indicating importance of the second flow entry and the importance indicated by the second information is lower than the importance indicated by the first information,
wherein the processor is further configured to, in response to determining that the second flow entry exists in the flow table, delete the second flow entry from the flow table and then add the first flow entry to the flow table.

20. The system according to claim 19, wherein the processor is further configured to send an error message to the controller when the second flow entry does not exist in the flow table, the error message indicating that an no idle resource for storing the first flow entry in the flow table exists.

21. The method according to claim 1, wherein the first flow entry comprises a field carrying priority information indicating matching precedence of the first flow entry, wherein the first flow entry further comprises a newly-added field carrying the first information.

22. The network device according to claim 10, wherein the first flow entry comprises a field carrying priority information indicating matching precedence of the first flow entry, wherein the first flow entry further comprises a newly-added field carrying the first information.

23. The system according to claim 19, wherein the first flow entry comprises a field carrying priority information indicating matching precedence of the first flow entry, wherein the first flow entry further comprises a newly-added field carrying the first information.

* * * * *